United States Patent Office 3,577,509
Patented May 4, 1971

3,577,509
PREVENTION OF SLUMPING IN THE MANUFACTURE OF A TAR BONDED REFRACTORY
Max Hicguet, Boulogne, Hauts-de-Seine, France, assignor to Societe d'Etudes et de Recherches Scientifiques et Minieres, Paris, France
No Drawing. Continuation of application Ser. No. 577,136, Sept. 6, 1966. This application July 25, 1967, Ser. No. 655,963
Claims priority, application France, Sept. 8, 1965, 30,765
Int. Cl. C04b 41/30
U.S. Cl. 264—336          13 Claims

ABSTRACT OF THE DISCLOSURE

To prevent pressed hot tar bonded brick from slumping while cooling to a temperature below the softening point of the tar binder the ejected brick are placed on pallets that support at least two of the vertical faces of the brick. The mold box on the brick press is maintained at a controlled temperature to harden the pressed brick to a sufficient depth to allow them to be handled from the press onto the pallets. This technique is used in processes that use low softening point tar binders, e.g., a tar having a softening point in the range of 39–80° C.

---

This application is a continuation of Ser. No. 577,136 filed Sept. 6, 1966, and now abandoned.

This invention relates to the manufacture of refractory bricks.

Numerous research investigations have been carried out with the aim of manufacturing refractory bricks comprising dolomite, magnesia or mixtures of the two, particularly for use in equipment, such as oxygen convertors, Kaldo furnaces etc., which are necessary for the manufacture of steel using oxygen.

The problem is particularly difficult to resolve because in industrial siderurgical furnaces extremely high temperatures are reached and in oxygen converters and especially in Kaldo furnaces there are slags containing more than 30% iron which are sufficiently fluid to be able to penetrate the pores of the bricks; as a general rule bricks manufactured in steelworks or for steelworks have porosities (volumetric proportion of pores) of the order of 3 to 4%.

The present invention provides a method which can be used to produce refractory basic constructional units of any desired definite shape (which for convenience are referred to herein as "bricks") which have a porosity of less than 3–4%. A reduction in the porosity of the bricks is associated with an increase in the number of tapings-off that can be withstood and an increase in the time for which the bricks can be stored without disintegrating or crumbling.

One of the features of the invention consists in subjecting a mixture of particles of a basic material and a hydrocarbon-based binder to a moulding operation at a temperature at which the binder is sufficiently plastic in order to allow the components of various particle sizes which comprise the refractory material to settle properly into position, leaving a minimum of voids between them, and then cooling each brick which has been moulded in this way whilst supporting it against deformation.

Another characteristic feature of the invention consists in subjecting the hot milture to vibrations and/or repeated tamping, as for example by blows from a low pressure press, in order to remove the air as completely as possible; the process may be carried out in the moulds into which the mixture has been poured. The applicants have in effect found that occluded air is at the root of the principal disappointments hitherto encountered, both because its presence results in an excessive porosity of the bricks and because the moisture which it carries is deleterious principally to dolomite and even to magnesia. In effect, when a brick is pressed, if moist air remains between the various components which form the brick, the condensed water in the air which has thus been compressed attacks the dolomite and causes it to decompose. Furthermore this air introduces a very high porosity into the bricks.

For this reason it is furthermore recommended, when implementing the present invention, to grind dolomite or magnesite, after leaving the sintering furnace, in the presence of air which is as dry as possible.

In the moulds, the material is then strongly compacted, either by powerful vibration accompanied by hydraulic pressure or by pressing at a high pressure, preceded by several strokes from a low pressure press or by repeated tamping so as to give bricks whose density and porosity are respectively as high and as low as possible.

The bricks produced at the end of the compression process are then cooled until they have become sufficiently hard not to change their shape when taken out of the mould. It is essential that sufficient cooling should take place whilst the mixture of refractory material and binder is still in the mould for the binder to harden and to allow removal from the mould without the bricks becoming deformed. It is furthermore advisable to put the bricks on edge for pressing them so that after removal from the mould they all have the same thickness and allow industrial furnaces with brick courses of regular thickness to be built. As a result of the cooling of the binders, especially binders containing high percentages of pitch, bricks are obtained which are sufficiently hard to permit removal from the mould without the geometrical shape of the bricks changing.

Bricks which are sufficiently cooled on the outside to permit their removal from the mould without changing their shape, may immediately thereafter be placed in a containing device, or false mould, where they are left to continue cooling. This cooling is essential in order to permit industrial production without immobilising the machine which makes the bricks for too long a period for cooling after moulding, which would excessively limit the brick production capacity.

When the bricks are placed in their containing device or false mould, their cooling must be continued for sufficiently long for the temperature at the core of the bricks to be sufficiently low that they can no longer deform; if this is not the case, they leave the mould cold on the outside but hot on the inside and eventually become externally reheated and deformed instead of having parallel faces they would bulge and no longer allow regular courses to be built when lining furnaces. The containing devices or false moulds thus have to be vigorously cooled by means of air or liquid coolants so that at the time that the brick is ready to be stocked or despatched there is no further risk of deformation.

The refractory material used may more particularly be sintered dolomite or sintered magnesia or a mixture of sintered dolomite and sintered magnesia. The mixture which is to be moulded may consist of 88 to 96% of its weight of sintered dolomite or sintered magnesia or a combination of the two, for example having finer particles of magnesia and coarser particles of dolomite. The particle size of this refractory constituent will be adjusted as a function of the materials used and, especially, of their geometrical shape. The mixture will generally comprise 25 to 60% of fine particles less than 2 mm., which in turn contain 20 to 60% of impalpable material (passing 0.08 mm. mesh) and 25 to 75% of particles greater than 2 mm.

The rest of the mixture may consist, to the extent of 4 to 12% of its weight, of a hydrocarbon-based binder resulting from the distillation of coal or of petroleum. This binder may especially consist of 40 to 80% of pitch, the remainder being principally oils. Pure pitch may also be used.

Such hydrocarbon binders generally are flowable at temperatures above 80° C., and the above mentioned temperature at which the binder has considerable plasticity is preferably one in the range 80–300° C., more generally 90–200° C.

The mixture may optionally have added to it, in small amounts, materials such as iron, alumina, carbon, plastic materials or plasticisers such as are customarily used in making refractory bricks.

The fire-resistance and durability of bricks of sintered dolomite are the greater, the greater the sintering which the dolomite has undergone and the faster that it is used after leaving the sintering furnace.

The ideal is to use sintered dolomite which is still hot, especially sintered dolomite whose temperature has not fallen below 100° C., thereby preventing the moisture of the air from condensing on it and starting to combine with it, thus reducing its quality.

In order for the mixture to be at this temperature it is either possible to use materials which are still hot as indicated above, or to reheat them before malaxating them by any known means such as a furnace or oven, or whilst they are being malaxated in an apparatus devised for this purpose, or after they have been malaxated, or finally, and even preferably, by combining these processes, thereby making it possible to maintain the mixture at the ideal temperature throughout the time which elapses between the start of its manufacture and its shaping into bricks.

All possible precautions have to be taken in order to eliminate moisture from the air and it is especially necessary to provide, above the equipment in which the dolomite or the mixture of dolomite and tar is reheated, air exhausts or fume exhausts for the water vapour which may still be present in the dolomite or in the air which is in contact with the dolomite whilst it is being heated or mixed by stirring.

When the mixture has been prepared in this way and is at the right temperature, the requisite amount for making each brick is metered, preferably by weighing, so that all the bricks should have as similar dimensions as possible after compression.

This weighing-out may be done carefully by hand or may be done by automatic machines, in such a way that the weight variation should not be more than a few tens of grammes for units weighing 10 to 50 kg. These weighings may especially be made by means of a weighing machine fed by a small conveyor the speed of which is reduced towards the end of the weighing in such a way that at the moment that the feed conveyor stops, triggered when the correct weight has been reached, there can only be very little material falling from the conveyor in excess of the prescribed weight.

The mixture which has been prepared and metered in this way is for example placed in the mould of a press which must compress the material very powerfully because in order to obtain units of optimum properties it is essential that they should be as compact as possible. The desirable residual porosity is less than 1% by weight.

In order to achieve this compaction it is necessary to subject the mixture in the mould to vibration, which has the effect of placing the particles in position and allowing the air to escape more easily from the material at the time of compaction. This vibration may be transmitted to the material through the various walls of the mould, especially if compaction is carried out vertically, by the bottom, by the sides or by the top of the mould, such top generally serving as the compaction stamp.

It is also possible, for the same purpose, to carry out compression in a vacuum or repeated compressions, optionally with differing forces or following a set cycle.

In order to overcome the deformation of the units after removal from the mould, they may according to the invention be first of all subjected to cooling in the moulds in which they are produced, and the moulds may for example have walls which are designed so as to be cooled by a fluid, for example circulating water or air.

The moulded mass must thus remain in contact with the cooled walls of the mould for a sufficient period that, after removal from the mould, it retains its initial shape either definitely or alternatively for a sufficient period for it to be placed in a containing device or false mould. Depending on the temperature of the mass, the nature of the binder and the particle size of the refractory material the time may for example range from 3 to 15 minutes in the former case and from 15 seconds to 3 minutes in the latter case.

In order to improve the output of the molding equipment the brick may, as stated above, be removed from the mould at the end of a relatively short period of time during which the surfaces of the bricks have cooled in contact with the mould and become sufficiently hard to hold the centre of the brick, which has not cooled and is still soft, without deformation for some time after removal from the mould. This may be utilised to place the bricks in a containing device where they can cool without deformation. It will be appreciated, however, that the brick must be placed in the containing device without undue delay, as the surfaces of the brick are progressively heated by the hotter centre, become soft and tend to deform.

The containing device may be a false mould comprising four or, more simply, two sheets of rigid material, for example sheets of steel or aluminum or wooden planks, maintained at the desired distance from one another whilst compressing the opposite faces of the brick, the assembly being placed on a table which may or may not be cooled. These false moulds may be of very simple construction, light and of low cost; they may also be cooled by any adequate means, which makes it possible to speed up their turn-round.

The finished bricks may be coated with a protective coating, for example one based on pitch and tar.

The applicant has found that the quality of the products is considerably improved by using dolomite which has been sintered to a very much greater degree than is normal, and which may even have been fused, and by using mixtures of dolomite (or dolomite together with magnesia) and of tar. The moulds may be graphite moulds.

While it is always preferable to use a dolomite which is as pure as possible, it is possible when using dolomites which have been fused in a flame furnace or in an arc furnace to accept a higher percentage of impurities such as silica and alumina, for example 1 to 3% for the $SiO_2$ and $Al_2O_3$ combined, than when using sintered dolomites.

In any case, the cooling of these bricks which are manufactured hot may be just as well carried out when using sintered dolomite as when using fused dolomite.

This cooling may in principle be achieved by means of cold air which is passed either into a chamber which contains the bricks or into a cover located above a conveyor on which the bricks or various units are carried whilst continuing to cool.

In some cases it may also be useful to provide machines in which the bricks are not removed from the mould as long as they have not hardened sufficiently and in this case the presses or machines for compacting the bricks may comprise an endless chain which carries a large number of moulds in which the dolomite or magnesia units are compacted and remain until they are cooled by means of air or other gases or, optionally, by means of water or another liquid coolant.

Another solution consists of producing dolomite or magnesia bricks in moulds which remain fixed on the machine and, when these bricks are removed from the machine, placing them into other moulds whilst causing them to preserve their shape during cooling, these bricks again being cooled by any means such as ambient air, cooled air and, optionally, circulation of a liquid coolant in the walls surrounding the chamber or in the conveyors holding the articles.

EXAMPLE

This illustrates the manufacture of refractory bricks from ground, sintered dolomite and a tar containing 63% of pitch and which is hard at a temperature below 39° C.

Freshly sintered dolomite was divided into 4 lots corresponding to the following grain size ranges: Below 2 mm. (the material comprising 33 percent of fine particles passing through a screen having mesh openings of 0.08 mm., and being designated for short as "0–2 mm. dolomite"); 2–4 mm.; 4–8 mm.; 8–16 mm.

There were placed into a mixing machine provided with heating means in its floor capable of maintaining the temperature of the contents at 160° C.:

120 kg. of said 2–4 mm. dolomite,
120 kg. of said 4–8 mm. dolomite,
120 kg. of said 8–16 mm. dolomite,
44 kg. of said tar previously heated to 160° C., and the batch was mixed for 15 minutes. After that period 240 kg. of said 0–2 mm. dolomite were added, and mixing was continued for 10 minutes, with heating so as to bring the mixture to 160° C.

The hot mixture was poured through a heated funnel into a distributing device capable of weighing and distributing predetermined weights of the mixture. 50 kg. quantities of the hot mixture were delivered to each of 5 cavities of a mold in a press. The base of each cavity was formed by part of a plate directly adjacent to the base of the mold, the plate being supported on a table. A ram was then lowered into each cavity to compact the charge therein when the table was vibrated for 2 minutes.

The mold was lifted to leave the hot bricks exposed on the plate, said plate with the bricks thereon pushed out of the press, and rigid hollow spacers inserted between adjacent bricks and at the ends of the bricks row so as to prevent the bricks from distorting, in particular bulging, during the cooling period.

The plate with the bricks and spacers thereon was pushed slowly through a tunnel across which a strong transverse cool air draft was passed, the spacers having channels therethrough providing passages for the coolant. The tunnel had a length of 4 meters, and the respective velocities of the cool air and the bricks were such that at the exit the cores of the bricks were cooled enough to enable the bricks to be handled, packed and shipped. The bricks thus obtained had a so-called "open porosity," measured in oil, as low as 0.3 percent.

What is claimed is:

1. A method for the manufacture of refractory bricks, comprising the steps of:
  (a) substantially deaerating and molding a mixture of particles of refractory material and a tar binder derived from the distillation of coal or petroleum and containing at least 40% pitch at a temperature whereat the said binder exhibits considerable plasticity;
  (b) cooling the thus-molded brick precursors while still in the mold to a temperature which is low enough to effect a degree of external hardness such as to permit their separation from the mold without deformation of their external geometry but which is greater than the temperature whereat said brick precursors are no longer susceptible to deformation:
  (c) withdrawing the thus-hardened brick precursors from the mold;
  (d) further cooling the said brick precursors to a temperature whereat no deformation can take place, each brick precursor being positively mechanically supported during the latter cooling step by means of at least one pair of rigid sheets, each pair of rigid sheets being applied at opposite faces of the thus-molded brick precursors, to ensure against deformation occurring during said latter cooling; and
  (e) removing the mechanical supports from the brick faces and recovering the resultant finished bricks.

2. The method as defined by claim 1, wherein said temperature under step (a) is about 80° C. to 300° C. and said binder is present in an amount of 4% to 12% by weight of said mixture; and under step (d) positive vertical mechanical support is provided and the temperature is below about 39° C.

3. The method as defined by claim 1, wherein the deaeration is effected by subjecting the mixture to vibrations.

4. The method as defined by claim 1, wherein the deaeration is effected by subjecting the mixture to tamping.

5. The method as defined by claim 1, wherein the deaeration is effected by subjecting the mixture to a pounding action.

6. The method as defined by claim 3, wherein the molding is conducted in a cavity mold, the walls of which are provided with cooling means, which cooling means are used to effect the initial cooling of the thus-molded brick precursors.

7. The method as defined by claim 3, wherein the molding is conducted at a temperature from between about 80° C. to about 300° C.

8. The method as defined by claim 7, wherein the particles of refractory material are comprised of a member selected from the group consisting of sintered dolomite, sintered magnesia and mixtures thereof.

9. The method as defined by claim 8, wherein the member selected from the group consisting of sintered dolomite, sintered magnesia and mixtures thereof has been subjected to maximum sintering.

10. The method as defined by claim 7, wherein the particles of refractory material are comprised of a member selected from the group consisting of fused dolomite, fused magnesia and mixtures thereof.

11. The method as defined by claim 7, wherein the mixture comprises from between about 88% to about 96% by weight of particles selected from the group consisting of dolomite particles, magnesia particles and mixtures thereof and from between about 4% to about 12% by weight of a said binder.

12. The method as defined by claim 11, wherein the binder consists essentially of pitch.

13. The method as defined by claim 12, wherein the temperature of the particles as charged is at least 100° C.

References Cited

UNITED STATES PATENTS

| | | | |
|---|---|---|---|
| 2,943,240 | 6/1960 | Martinet | 266—43 |
| 3,015,850 | 1/1962 | Rusoff et al. | 264—29 |
| 3,268,633 | 8/1966 | Jansen | 264—29 |
| 3,286,003 | 11/1966 | Bullough et al. | 264—29 |
| 3,364,043 | 1/1968 | Davies | 106—58 |
| 2,540,354 | 2/1951 | Selden | 264—57 |
| 2,714,239 | 8/1955 | Minnium | 264—58 |
| 3,070,449 | 12/1962 | Davies et al. | 264—30 |
| 3,352,702 | 11/1967 | Leitner et al. | 264—29 |

OTHER REFERENCES

R. H. McElroy et al., "How To Make Tar-Bonded Basic Refractories," an article appearing in the August 1963 issue of Brick & Clay Record at pp. 32–34.

JULIUS FROME, Primary Examiner

J. H. MILLER, Assistant Examiner